Patented Dec. 14, 1943

2,336,618

UNITED STATES PATENT OFFICE 2,336,618

PROCESS OF TREATING IRON ORE

Russell H. B. Jones, Duluth, Minn.

No Drawing. Application December 23, 1941,
Serial No. 424,195

7 Claims. (Cl. 75—3)

In accordance with the present invention, there are provided improvements in the preparation of a hard, dense product from porous, high moisture-containing iron ore which product is suitable for adding to the melt in an open hearth furnace.

In the Mesabi range of Minnesota, for example, there are found the largest open pit mining operations of iron ore in the world. These ores are mainly soft, porous, blue, red, yellow and brown hematites, with minor amounts of magnetite and some of the hydrated oxides of iron.

In the use of iron ore in an open hearth melt, it is a requisite that the ore be in a hard and dense condition, and of low moisture content. However, certain ores, such as, for example, Mesabi range ore in its natural state are not satisfactory materials for the purpose of open hearth charging, on account of its being soft, porous, and of high moisture content, there being approximately 10% of moisture. This moisture content is a source of danger when charged into molten metal, and, furthermore, it makes the Mesabi ore bulky and light in weight. Consequently, this ore does not possess requisite physical properties for enabling its use as a component in the charge of an open hearth furnace, where it is customary to use iron ore to deliver oxygen where it is needed in the furnace charge for oxidizing impurities present therein.

However, in view of the ease with which the Mesabi ores are obtained, it is very desirable to utilize such ore in open hearth operations.

The present invention has for its principal object the provision of a process which enables the light, porous and bulky iron ores to be converted into dense and compact masses which are wholly suitable for use in open hearth furnace operations.

Further objects and advantages of the process of the present invention will become apparent as the description proceeds, and the features of novelty will be pointed out in particularity in the appended claims.

The present process includes the steps of dehydration of the ore, briquetting, and incipient sintering. These steps will be discussed in greater detail hereinafter.

In the operation of the improved process, the soft ore, of high iron content, may be crushed or ground, if necessary, to a suitable fineness so that it may be dehydrated readily. Because of the natural fineness of the Mesabi ore, however, a considerable quantity of the ore already is fine enough in the natural state, so that no crushing or grinding thereof is necessary, it being sufficient simply to screen the ore. Additionally, there are certain concentrates that are of sufficient fineness so as not to require crushing.

After crushing, or screening, the ore is dehydrated, if necessary to eliminate both hygroscopic water and water of crystallization. This dehydration may be carried out in either a sintering machine, a furnace, or rotary kiln under oxidizing conditions, in order to utilize the oxygen in the ore for this purpose. The temperature of the dehydration must be controlled to prevent melting of the ore, or the formation of iron silicates. The quantity of heat required to dehydrate an iron ore containing 10% moisture is approximately 500 B. t. u.'s per pound of ore, or 1,120,000 B. t. u.'s per long ton of raw ore.

The next step of the process is the step of briquetting.

In accordance with this process, the dehydrated ore from the dehydration stage is passed directly into a hopper from which it is fed, in measured quantities, into a mechanical cylindrical pressure chamber.

The briquetting was performed under pressure only, no binding agent being employed to form the briquettes, owing to the unpredictable behavior thereof when made a portion of a furnace charge. In the present case, the elimination of the binding material eliminates likewise the possible presence of deleterious substances which might be formed from the binding material. The ores, dried and screened through 100 mesh are formed into briquettes under a pressure of 20 tons per square inch, although, in some instances, pressures of about 20,000 pounds per square inch on heated ore produce a non-porous and compact ore cylinder. In the event that the above-mentioned ore cylinders, which are briquetted without any binder, do not have sufficient crushing strength to stand rough handling, they may require a superficial sintering to add strength to the outer layer or "crust" of the cylinder. This is accomplished by passing the compacted cylinders of ore through a small soaking pit or furnace, sintering machine or similar equipment, for "case hardening."

Ores being briquetted for the purpose of this invention are processed as follows:

Dried Mesabi ore from the Minnewas mine was screened to 100 mesh and briquetted under 20 tons pressure per square inch.

Dried ore from the Spruce mine was sized to 100 mesh and briquetted under 20 tons pressure per square inch.

The ore in natural condition from the Spruce mine was sized to 40 mesh and briquetted under 20 tons pressure per square inch.

Dried ore from the Spruce mine was crushed to ¼" mesh and briquetted under 25 tons pressure per square inch.

Natural Spruce ore crushed to ¼" mesh was briquetted under 20 tons pressure per square inch.

Ore taken from the Spruce mine was dried at

212° F., assayed approximately iron 65.62%, phosphorus 0.044%, silica 2.54%, manganese 0.46%, moisture 2.40%, alumina 0.67%, and natural iron 64.04%.

A sample of ore from the Minnewas pit, which was sampled from an ore dump of cast material in the bottom of the pit assayed approximately iron 61.41%, phosphorus 0.061%, silica 3.20%, manganese 0.32% and alumina 1.63%.

With these two ores as test material, it was determined first at what pressure a briquette will form. At 5 tons per square inch a coherent mass was produced, which, however, crumbled on handling. At 10 tons a more compact coherent mass forms, which still could be crushed on handling. At 15 tons a compact, heavy cake formed which stood the handling and impact of a 2 foot drop on a concrete floor, but at 3 feet the cylindrical cake cracked into several pieces when so dropped. However, at 20 tons a still harder and more compact, heavy cake was formed which will not break until dropped from a height of 4 feet. These tests showed the production of a substantially non-porous product.

The best cakes for this purpose are obtained from dehydrated ore, high in alumina content, which pass through a 40 to 100 mesh screen. As cakes could be formed at 20 tons pressure per square inch which were satisfactory, and which may be produced from all types of ore, this pressure of 20 tons was used on most of the tests made, and which is recommended as being preferred for use, but the amount of briquetting pressure to be employed greater or less than 20 tons depends importantly upon the character of the ore, and the hardness of its outer surfaces.

If in practice satisfactory briquettes are not obtained from the above-described procedure, the compacted briquettes may be sintered superficially as described above, which treatment produces a "case hardened" briquette, which casing is composed either of crystalline iron oxide, or partially sintered iron oxide. This "casing" is formed by subjecting the compressed briquettes to temperatures of from 2200° F. to 2400° F., although the temperature required in any case may vary substantially, depending on the character of the particular ore being treated.

The resulting material is a compact mass, which is dehydrated, which is substantially non-porous, and which is sufficiently heavy and solid so that it sinks readily when charged into an open hearth furnace melt; and the resulting briquettes are free from binder or other extraneous material.

As an alternate procedure to "case hardening," the soft dried material may be compressed into containers or receptacles which then are ready for furnace charging.

While the process of the invention has been described with particular reference to soft, porous iron ores, other materials rich in iron oxide, such as flue dust, scale, and concentrates, may be treated likewise to compact and harden them, thereby rendering them suitable for furnace charging without introducing any extraneous materials therein.

I claim:

1. The process of conditioning iron ores to make such ores suitable for introducing into an open hearth melt, which comprises converting the said ores from a finely divided condition into a dense and hard mass by heating the said ores until dehydrated, briquetting the resulting dehydrated ore by compression under a pressure of approximately twenty tons per square inch until a substantially non-porous agglomeration is produced, and heating the resulting briquetted ore to a temperature of from approximately 2200° F. to approximately 2400° F. for producing a hard casing on the briquetted ore.

2. In preparing iron oxide material for a furnace charge, the improvements which comprise briquetting such material in dehydrated and finely divided condition and in the absence of a binder, by compressing the ore into dense, hard briquettes and increasing the strength of the said briquettes by heating them to temperatures between 2200° F. and 2400° F. until they become case hardened.

3. The process of treating a finely divided iron ore for improving its suitability for use in a furnace charge, which comprises heating the said ore in finely divided condition sufficiently to substantially completely dehydrate the ore, subjecting the resulting dehydrated ore to briquetting pressures sufficiently high to compress the ore into a dense and hard condition, and increasing the strength of the resulting briquetted ore by subjecting them to a temperature between 2200° F. and 2400° F. until the briquetted ore becomes case hardened.

4. The process of treating a finely divided, iron ore for improving its suitability for use in a furnace charge, which comprises heating the said ore sufficiently high to dehydrate the ore substantially completely but below fusion temperature of the ore, subjecting the resulting dehydrated ore while hot to sufficient pressure to cause the ore to form of itself a hard, substantially non-porous mass, the said pressure being of the order of twenty tons per square inch, and thereafter increasing the strength of the compressed mass by heating the said mass until it is incipiently sintered.

5. The process of conditioning iron oxide material to render it suitable for introducing into an open hearth furnace melt, which comprises changing the material in finely divided and dehydrated condition from the said finely divided condition into dense and hard briquettes by compressing the said material into the dense and hard mass under pressures sufficient to convert the material into a substantially non-porous agglomerate, and, heating the resulting briquetted material to temperatures sufficiently high to produce a hard casing on the briquetted material.

6. The process of conditioning soft, porous iron oxide material to render the same suitable for introduction into an open hearth melt, which comprises compressing the material in dehydrated condition under pressures sufficient to convert the soft, porous material into a substantially non-porous agglomerate, and heating the said agglomerate to a temperature requisite for producing a hard casing thereon.

7. The process of conditioning soft, porous iron oxide material to render the same suitable for introduction into an open hearth melt, which comprises converting the material in dehydrated condition into a dense and hard mass by briquetting the material under a pressure of the order of twenty tons per square inch until a substantially non-porous agglomerate is produced, and heating the resulting briquetted material to a temperature requisite for producing a hard casing thereon.

RUSSELL H. B. JONES.